(12) United States Patent
Whang et al.

(10) Patent No.: US 10,132,489 B1
(45) Date of Patent: Nov. 20, 2018

(54) ILLUMINATED CONTAINERS

(71) Applicants: Peter Whang, Kennesaw, GA (US); Lianne B. Whang, Kennesaw, GA (US)

(72) Inventors: Peter Whang, Kennesaw, GA (US); Lianne B. Whang, Kennesaw, GA (US)

( * ) Notice: Subject to any disclaimer, the term of this patent is extended or adjusted under 35 U.S.C. 154(b) by 0 days.

(21) Appl. No.: 15/393,241

(22) Filed: Dec. 28, 2016

Related U.S. Application Data

(63) Continuation of application No. 62/271,676, filed on Dec. 28, 2015.

(51) Int. Cl.
| | |
|---|---|
| *F21V 21/096* | (2006.01) |
| *F21V 8/00* | (2006.01) |
| *F21V 33/00* | (2006.01) |
| *F21V 19/00* | (2006.01) |
| *B65D 25/54* | (2006.01) |
| *B65D 25/24* | (2006.01) |
| *A01G 9/02* | (2018.01) |
| *A01G 9/20* | (2006.01) |
| *A01G 7/04* | (2006.01) |
| *A01K 63/06* | (2006.01) |
| *F21Y 115/10* | (2016.01) |

(52) U.S. Cl.
CPC ............. *F21V 33/00* (2013.01); *A01G 7/045* (2013.01); *A01G 9/02* (2013.01); *A01G 9/20* (2013.01); *A01K 63/06* (2013.01); *B65D 25/24* (2013.01); *B65D 25/54* (2013.01); *F21V 19/0015* (2013.01); *G02B 6/0006* (2013.01); *G02B 6/0008* (2013.01); *F21Y 2115/10* (2016.08)

(58) Field of Classification Search
CPC . A01G 9/02; A01G 9/04; A01G 7/045; A01K 63/06; F21V 21/096; F21V 33/0028
See application file for complete search history.

(56) References Cited

U.S. PATENT DOCUMENTS

| | | | | |
|---|---|---|---|---|
| 4,097,917 A | * | 6/1978 | McCaslin | ............. F21S 10/005 |
| | | | | 362/234 |
| 5,067,059 A | * | 11/1991 | Hwang | .................. A01K 63/06 |
| | | | | 119/253 |
| 6,964,130 B1 | * | 11/2005 | Hartelius | ................. A01G 9/02 |
| | | | | 362/154 |
| 8,113,147 B1 | * | 2/2012 | Wang | ..................... A01K 63/06 |
| | | | | 119/267 |

(Continued)

*Primary Examiner* — Peggy Neils
(74) *Attorney, Agent, or Firm* — Michael J. Bootcheck, LLC; Michael J. Bootcheck

(57) ABSTRACT

The present invention is for illuminated containers and illuminated container systems comprising one or more light emitting sources which may be incorporated into the base in combination with a container to be illuminated (such as a terrarium). In one embodiment, one or more light emitting sources may be incorporated into a base such that light from the light emitting sources projects into a container where fiber optic cables may be embedded to receive the light such that the light can be carried and emitted at various locations throughout the container even though there is no light source in the container itself. Multiple fiber optic bundles may be used depending on the size of the glass container and the desired installation. Various indexing means may be utilized to insure alignment between the light emitting sources and the light receiving articles.

8 Claims, 4 Drawing Sheets

(56) References Cited

U.S. PATENT DOCUMENTS

| | | | | |
|---|---|---|---|---|
| 9,326,494 B2* | 5/2016 | Allen | .................... | A01K 63/06 |
| 9,568,185 B2* | 2/2017 | Embler | .................... | F21S 9/02 |
| 2003/0081429 A1* | 5/2003 | Wong | .................... | A01K 63/06 |
| | | | | 362/568 |
| 2007/0279905 A1* | 12/2007 | Chan | ................ | A47G 19/2227 |
| | | | | 362/253 |

* cited by examiner

ILLUMINATED CONTAINERS

CROSS-REFERENCE TO RELATED APPLICATIONS

This application claims priority from U.S. Provisional Application Ser. No. 62/271,676 filed 28 Dec. 2015, which is titled "ILLUMINATED TERRARIUM", which is hereby incorporated in its entirety by reference.

FIELD OF THE INVENTION

The present invention is for illuminated containers such as terrariums and other containers for which illumination is desired on the interior of the container but without placing electric/electronic devices inside the container and without having holes through the sidewalls or bottom of the container.

BACKGROUND OF THE INVENTION

There are many terrariums, aquariums and other containers which are illuminated with artificial light. Unfortunately, these are usually illuminated by unsightly light fixtures above the tank, present a dangerous condition in which electrical devices/electronics are positioned inside the container, or there are holes cut through the walls of the container such that water and debris can pass/escape or block the light. What is needed is a container/container system (for example terrariums, aquariums, and other containers) which allows for light to be distributed on the inside the container but which does not have holes through the walls, or bottom and does not necessitate electronics (or other electric devices) on the inside of the container. By positioning the illumination source outside the container, the risk of accidental electrocution is also removed. It is further desired that the light be positionable as desired within the container.

SUMMARY OF THE INVENTION

The present invention is directed to illuminated containers (or, alternatively, a container lighting system/method) that maintains the integrity of a closed or open container (terrarium, aquarium, or other container) without endangering the plant/animal life within. It employs the use of a lighted base (or any illumination source) that can be accurately aligned to project light emitted from the base into the interior of a container (with fiber optic fibers/cables/housings which may be suitable for various embodiments of the system). Housings may be used to capture and/or direct the light once the light is inside the container. Such housings may hold one or more light conveying light receiving articles such as transparent rods, fiber optic cables, etc. Such housings can be mounted to a wall or the bottom of the interior of the container. The housings (if present) should be attached to the container on a transparent surface that allows light to pass through from the external light emitting source. The fiber optic cables may be replaceable as they may be cut or trimmed during the terrarium construction. Indexing means (such as magnets) attached to the container and to the light emitting source (or some part in fixes relation to the light emitting source such as the base in which the light emitting source may be fixed) may be employed to maintain accurate positioning/alignment of the light source when there is more than one center position light.

In one embodiment, the illuminated container system comprises an at least partially transparent walled container having an interior and an exterior, a base for supporting the container, one or more light emitting sources for shining light into the container through a transparent portion of the container, one or more light receiving articles positioned interior to the container for receiving light from the light emitting sources, at least one pair of indexing means wherein a first member of the indexing means is located in the base and a second member of the indexing means is located on the interior of the container, and the light emitting sources is positioned exterior to the container and light emitted from the light emitting sources passes through at least a portion of the container and is received, and conveyed by, the one or more light receiving articles.

DETAILED DESCRIPTION OF THE INVENTION

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

Figure 1:
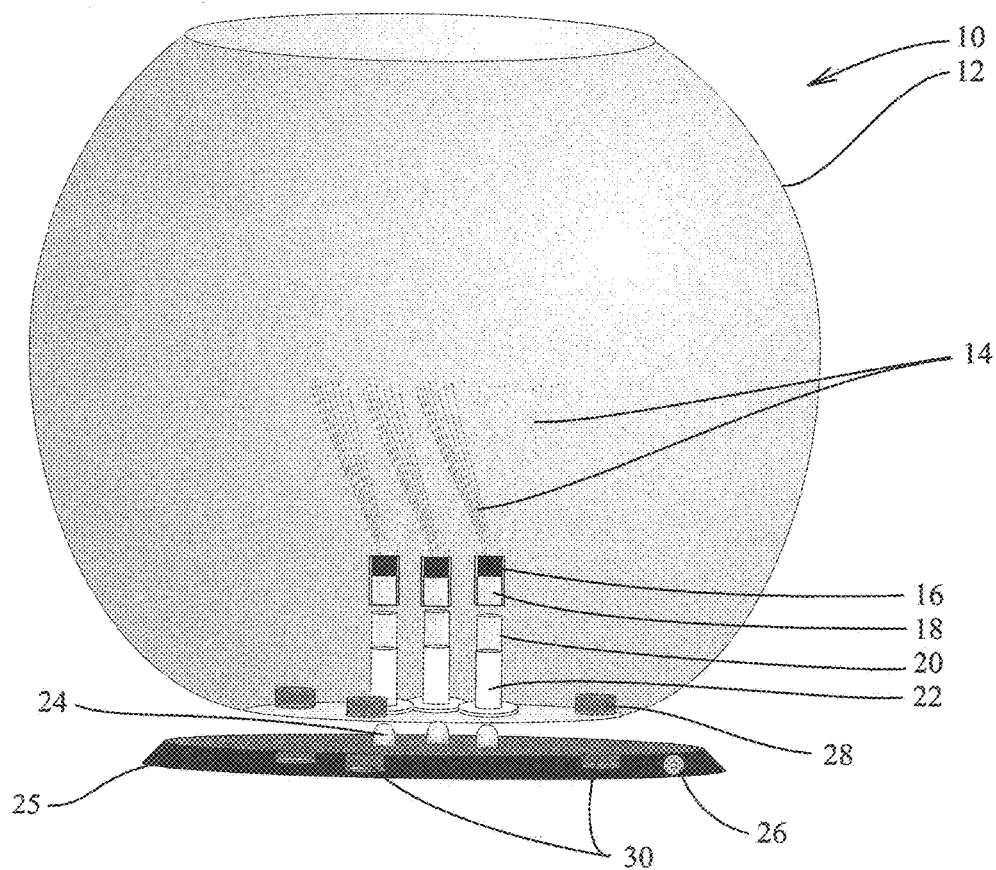
FIG. 1 illustrates a side view of an exemplary embodiment of the present invention showing an exemplary terrarium.

FIG. 1 illustrates a side view of an exemplary embodiment of the present invention showing an exemplary illuminated container system (such as a terrarium or other container system) 10, an at least partially transparent walled container having an interior and an exterior (such as a glass or other (at least partially) transparent walled container, depending on the specific embodiment) 12, fiber optic cables 14 (which may be the light receiving article as further described below), sleeves or PVC sleeves 16 (which may be utilized to hold one or more fiber optic cables), LDPE sleeve/housing 18, acrylic rod 20, light receiving articles (LDPE in this embodiment) 22, light emitting sources (for example light emitting diodes) 24, base 25, electrical/power socket (for example DC female socket) 26, first member of a pair of indexing means 28 (for example, a magnet), and second member of the pair of indexing means 30 (which pair with member 28). In this embodiment, there is at least one pair of indexing means 28, 30 wherein first member 28 pairs with second member 30 so that container 12 is in a predetermined relationship with base 25 so that light emitting sources 24 are aligned with light receiving articles 22.

The light receiving article(s) may be in any suitable form including translucent rods or other translucent components, fiber optic cable(s) or other members for conveying light. Clear epoxy may be utilized to mount the light receiving article(s) to the container. Tubes may be used to connect the light receiving article(s) to various other member such as additional rods, fiber optic cables, etc. in order to prevent debris from obstructing the transmission of light. Such tubes may allow for easy replacement of various members such as rods, fiber optic cables, etc. The use of epoxy allows for use even if the walls, or bottom, of the container is uneven or obstructed as the clear epoxy will allow the transmission of light while the epoxy is able to provide a solid (i.e., debris preventing) connection between the container surface and the light receiving article. This also enables various embodiments with goblet shaped containers or even with containers with long necks. The use of fiber optic cable bundles allows for a relatively small base to produce light in an area much larger than the base itself through proper distribution of the individual fiber optic cables.

In this embodiment, magnets are utilized as the indexing means/aligning pairs 28, 30, with a first magnet positioned fixedly inside and relative to the container and a second magnet (or at least magnetic material such as metal) is affixed to the base such that the magnet allows a user to easily align the terrarium (or other container such as an aquarium or other at least partially transparent article) relative to the base (note that the magnet may also be in the base and a metal or other magnetic material may be placed inside the container). Note that although magnets are utilized in the illustrated embodiment, other indexing means may be utilized. In some embodiments, the indexing means may be aligned in a North South positioning. The use of magnets also allows for easy removal/separation of the base and container pairing.

One purpose of aligning the two components (light emitting source and light receiving article) is so that the light from the LED's (or other light emitting source) is efficiently and effectively aligned to send the light into the container such as is effected by aligning the LED's with the transparent rods as illustrated so that the light can be efficiently transmitted from outside the container to an interior of the container even if there is moss, gravel, other substrate or other debris located along the bottom of the container.

Note that any suitable number of pairs of indexing means may be utilized. In some embodiments, the arrangement of the indexing means may be non-symmetrical/asymmetrical such that there is a single "correct" alignment between the base and the container in order to present an aligned pairing between the light emitting source(s) and light receiving article(s). In other embodiments, the indexing means pairs may be symmetrical if the light emitting sources and light receiving articles are suitably aligned for each of the possible combinations of pairs so that the user may more easily place the container relative to the base while still maintaining the alignment of the light emitting sources and light receiving articles.

Note that translucent walled containers may also be used in specific embodiments. Note also that the light receiving articles may be comprised of one or more components and may be any suitable component including, but not limited to, a housing, a translucent housing, one or more fiber optic wires/cables/fibers, and translucent rods. In some embodiments, there may be a housing attached to a wall, or the bottom, of the interior of the container such that light from the light emitting source passes through the wall or bottom of the container and is received by the housing as the light receiving article(s) (or another component if the housing is holding/restraining the light receiving article).

In this embodiment acrylic rods 20 are light receiving articles which receive light emitted from the light emitting source(s) (i.e., LED's or other light source) and convey the light along their path to an interior portion of the container as desired. The light can also be received, or passed onto one or more fiber optic cables, cords, wires, etc. such that the light may be directed/routed to a desired location.

Note that housings, per se, are not required in all embodiments as the transparent rods or fiber optic cables (or other light receiving article) may be attached directly to an interior surface of the container. Also note that although the light emitting source(s) are illustrated in some embodiments as being incorporated with the base, such is not required in all embodiments as the only requirement is that there be alignment between the light emitting source and the light receiving article. Thus, in some embodiments, the light emitting source(s) may be in a location other than the base as long as there is some indexing means to maintain such alignment for a user when placing the light emitting source/light receiving article pairing(s).

Figure 2:
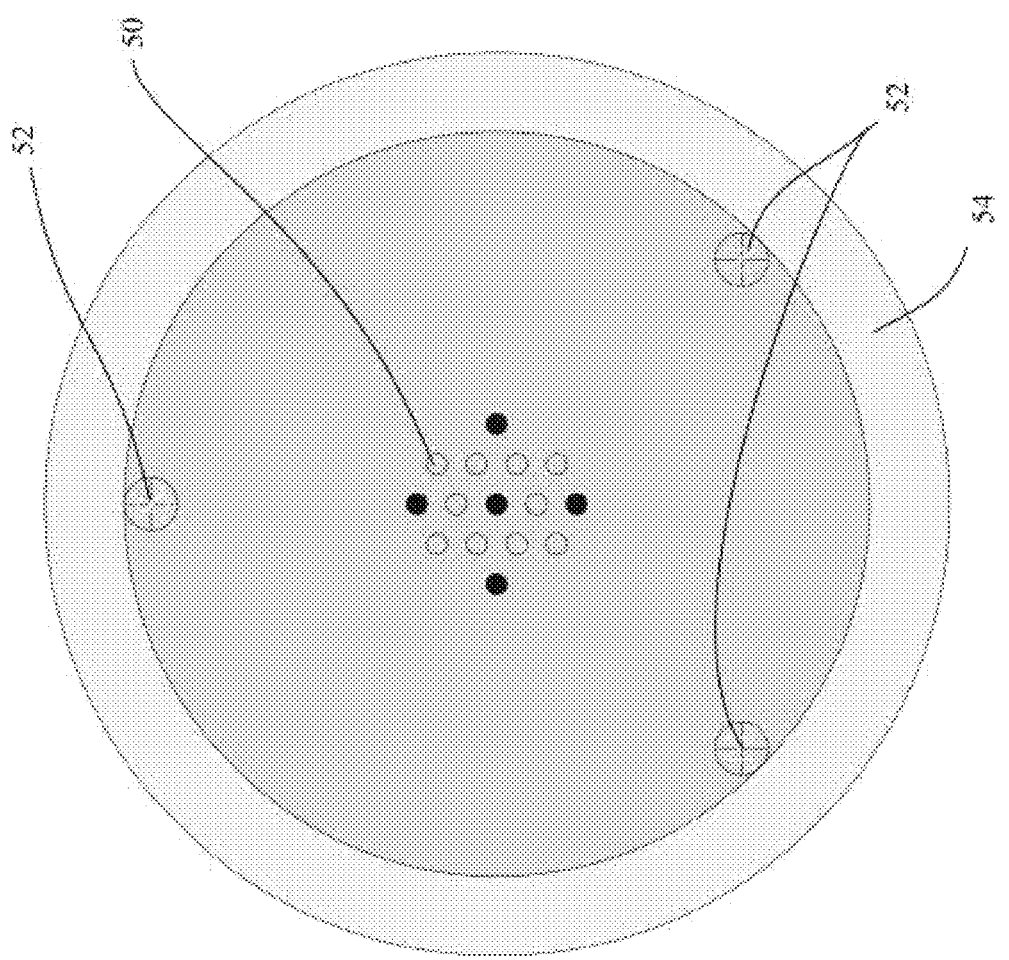
FIG. 2 illustrates a top view of a portion of an exemplary embodiment of the present invention.

FIG. 2 illustrates a top view of an exemplary arrangement of an exemplary embodiment of the present invention showing various light emitting sources/light emitting diode matrix/light receiving articles 50 (these may be same as the light emitting sources 24/light receiving articles 22 from the embodiment of FIG. 1), indexing means/pairs/aligning means 52 (magnets in this embodiment, these may be same as in indexing means 28, 30 from the embodiment of FIG. 1), and round base 54 (this may be the same as base 25 of the embodiment of FIG. 1).

Figure 3:
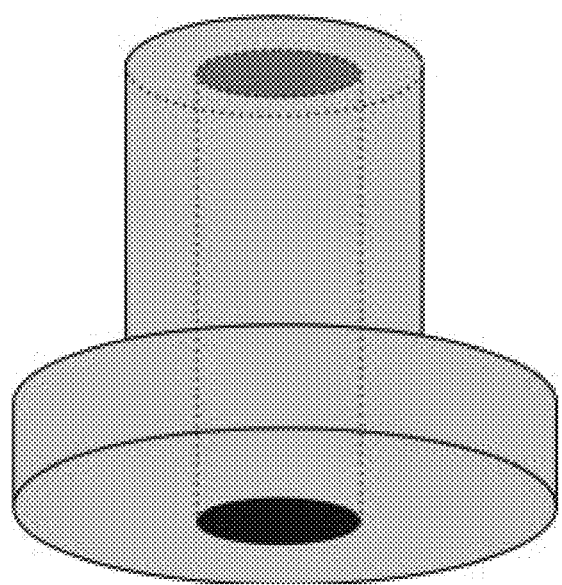
FIG. 3 illustrates an exemplary t-mount housing.

FIG. 3 illustrates an exemplary t-mount housing. Such a housing may be used to hold a rod, a fiber optic cable, a bundle of fiber optic cables, etc. in various embodiments. The bottom portion of the housing illustrated may be fixedly mounted to an inner surface of the container. In some embodiments, the housing may be permanently mounted so that debris may not get between the housing and the wall of the container so as to allow the light to pass from the light emitting source to the light receiving article without being blocked by the debris.

Figure 4:
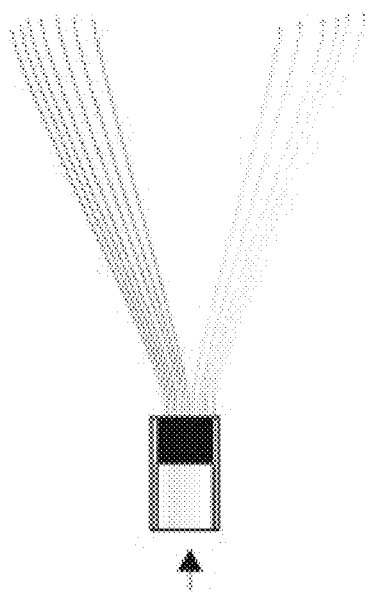
FIG. 4 illustrates an exemplary fiber optic terminal/terminator/cable.

FIG. 4 illustrates an exemplary fiber optic terminal/terminator. Such a terminal may be a housing for one or more transparent rods, fiber optic cables/bundles, etc. Such housing may be fixedly attached to a wall on the interior of the container.

Figure 5:
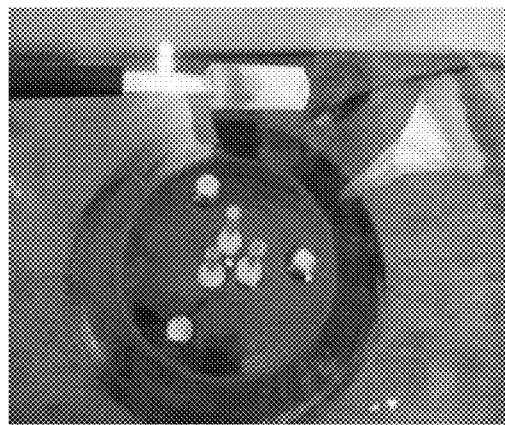
FIG. 5 illustrates an exemplary fiber optic terminal/terminator/cable.

FIG. 5 illustrates an exemplary fiber optic terminal/terminator. This embodiment illustrates an exemplary relationship between container 12, base 25, indexing mean/pairs 28, 30, and light receiving articles 22.

Figure 6:
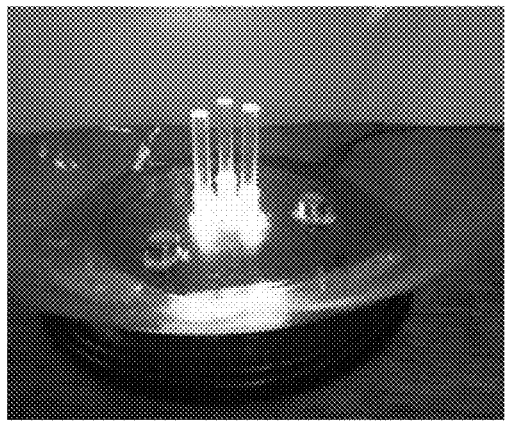
FIG. 6 illustrates an exemplary base with translucent rods/acrylic rods illuminated.

FIG. 6 illustrates an exemplary base with acrylic rods illuminated. In this embodiment, translucent rods are mounted to the interior of container 12 such that light from the light emitting sources passes into the rods.

Figure 7:
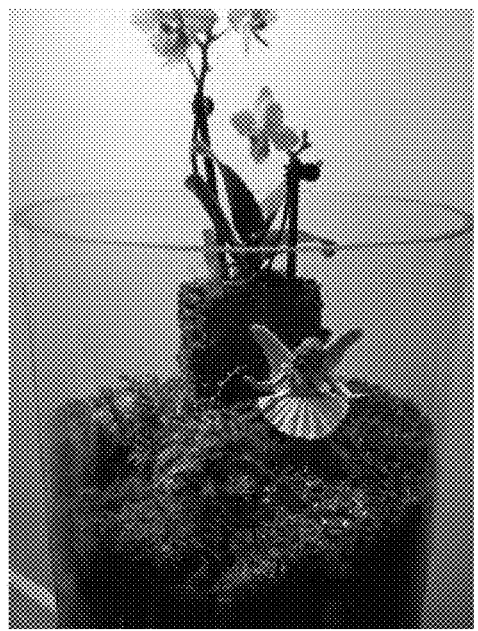
FIG. 7 illustrates an exemplary fiber optic terrarium.

FIG. 7 illustrates an exemplary fiber optic terrarium. As illustrated in this embodiment, the light from the light emitting sources may be directed into a plurality of locations via the use of a bundle of fiber optic cables.

Various embodiments may include one or more narrow field light sources such as light emitting diodes. These may be embedded in a base that is strong enough to support the weight of the container when it is full. The number of light emitting sources may be varied depending on the diameter of the container and user preferences. A voltage regulator may be used to maintain steady current and voltage to the lights.

In some embodiments, the bases may have magnets or other means mounted internally or externally in a 2 position line segment or a 3 position triangle although any suitable number of magnets (or other indexing/aligning means may be utilized). Magnets may be mounted inside or outside the container in a mated pattern as on the base. The use of adhesive may be used to keep the magnets from shifting. Magnets with a gauss rating powerful enough to hold the container and the base in the proper position may be used to keep the alignment between the base and container. In some embodiments, the magnets are strong enough to hold the base to the container even if the container is lifted up.

Small T-Mount housings may be attached to the glass using a clear waterproof adhesive (although non-clear adhesives may be used if care is taken to make sure that the adhesive does not interfere with the transmission of light from the light emitting source to the light receiving article (s). In this exemplary embodiment, the housings are positioned in alignment with the light emitting source(s) when the base is attached and illuminated in order to maximize the light transmission into the container. The housings hold may hold acrylic rods that extend from the top, at least ½" (although other embodiments may not have any rods). These rods may also be attached with clear waterproof adhesive. The rods in this embodiment have polished ends to minimize/prevent light loss.

In the illustrated embodiment, fiber optic bundles are attached to the acrylic rods (in some embodiments the bundles may be removable and/or replaceable). The fiber optic termination does not allow dirt or moisture to penetrate to interfere with the transmission of light. The fibers in this embodiment are stiff enough to pierce the moss but flexible enough to lay flat under the moss when pressed down. In this embodiment, 0.5 mm 50 strand end glow fiber optic cable wrapped in a black flexible PVC jacket are utilized. The jacket is cut to 0.25" length and inserted into a 1" segment of LDPE plastic tubing. This tubing is ¼" inner diameter and mounts on the ¼ inch acrylic rod. No adhesive is used to attach the fiber optic terminator to the rod, so it can be replaced when necessary.

The strata of the terrarium or other installation may be built with the fiber bundles exposed at the surface. The fibers may be fed through the final moss layer and cut at the desired height.

Although various components of the present invention may be illustrated as being of a particular shape for convenience, such components may be of any suitable shape, configuration, orientation, etc.

While the specification has been described in detail with respect to specific embodiments thereof, it will be appreciated that those skilled in the art, upon attaining an understanding of the foregoing, may readily conceive of alterations to, variations of, and equivalents to these embodiments.

What is claimed is:

1. An illuminated container system, said system comprising:
    an at least partially transparent walled container having an interior and an exterior,
    a base for supporting said at least partially transparent walled container,
    one or more light emitting sources for shining light into said at least partially transparent walled container through a transparent portion of said at least partially transparent walled container,
    one or more light receiving articles positioned interior to said at least partially transparent walled container for receiving light from said one or more light emitting sources,
    wherein said one or more light emitting sources is positioned exterior to said container and light emitted from said one or more light emitting sources passes through at least a portion of said at least partially transparent walled container and is received, and conveyed by, said one or more light receiving articles, and
    said base has either a magnet or a ferromagnetic material permanently mounted therein or thereon as a first mating member of an alignment pair, and
    said container has either a magnet or a ferromagnetic material permanently mounted therein or thereon a second mating member of said alignment pair, and
    at least one of said first mating member and said second mating member is a magnet, and
    such that said first mating member and said second mating member must be in close proximity to allow and facilitate consistent and accurate alignment of said base and said container when said container is placed onto said base due to magnetic attraction between said first and second mating members.

2. The system of claim 1, further comprising at least one pair of indexing means wherein a first member of said at least one pair of indexing means is located on said interior of said at least partially transparent walled container and a second member of said at least one pair of indexing means is located in said base.

3. The system of claim 1, wherein said one or more light emitting sources is positioned in said base.

4. The system of claim 1, wherein there is no hole in said at least partially transparent walled container between said one or more light emitting sources and said one or more light receiving articles.

5. The system of claim 1, wherein one or more of said light emitting sources is incorporated into said base for shining light into said at least partially transparent walled container through a transparent portion of said at least partially transparent walled container.

6. The system of claim 1, wherein said one or more light receiving articles is one or more transparent rods and said one or more rods is bonded or glued to said container such that no water or other material can intrude between said one or more rods and said container.

7. The system of claim 1, wherein said one or more light receiving articles is a bundle of two or more fiber optic cables.

8. The system of claim 1, wherein said one or more light receiving articles is fixedly attached to said interior of said at least partially transparent walled container.

* * * * *